United States Patent
Hishinuma et al.

(10) Patent No.: US 12,116,489 B2
(45) Date of Patent: Oct. 15, 2024

(54) ELECTRON BEAM-CURABLE PRINTING INK COMPOSITION AND ELECTRON BEAM-CURABLE OVERPRINT VARNISH COMPOSITION

(71) Applicant: SAKATA INX CORPORATION, Osaka (JP)

(72) Inventors: Keishiro Hishinuma, Osaka (JP); Naoki Omi, Osaka (JP); Aika Nishimoto, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 342 days.

(21) Appl. No.: 17/435,660

(22) PCT Filed: Mar. 2, 2020

(86) PCT No.: PCT/JP2020/008614
§ 371 (c)(1),
(2) Date: Sep. 1, 2021

(87) PCT Pub. No.: WO2020/189234
PCT Pub. Date: Sep. 24, 2020

(65) Prior Publication Data
US 2022/0145105 A1    May 12, 2022

(30) Foreign Application Priority Data
Mar. 15, 2019    (JP) .................. 2019-048972

(51) Int. Cl.
C09D 11/101    (2014.01)
C08L 83/06    (2006.01)
C09D 11/102    (2014.01)

(52) U.S. Cl.
CPC ............ *C09D 11/101* (2013.01); *C08L 83/06* (2013.01); *C09D 11/102* (2013.01)

(58) Field of Classification Search
CPC ..................................................... C08L 83/06
See application file for complete search history.

(56) References Cited

U.S. PATENT DOCUMENTS

| | | | | |
|---|---|---|---|---|
| 2002/0121631 | A1* | 9/2002 | Rahman | C09D 4/00 252/500 |
| 2005/0261391 | A1* | 11/2005 | Narayan-Sarathy | C09D 175/16 522/173 |
| 2007/0120922 | A1* | 5/2007 | Belelie | G03G 8/00 347/100 |
| 2010/0285232 | A1 | 11/2010 | Kakino | |

FOREIGN PATENT DOCUMENTS

| | | |
|---|---|---|
| EP | 2042564 A1 | 4/2009 |
| EP | 2042563 B1 | 11/2010 |
| JP | 2000186228 A | 7/2000 |
| JP | 2003147001 A | 5/2003 |
| JP | 2003147230 A | 5/2003 |
| JP | 2004359767 A | 12/2004 |
| JP | 2005015755 A | 1/2005 |
| JP | 2007045103 A | 2/2007 |
| JP | 2007045104 A | 2/2007 |
| JP | 2007161998 A | 6/2007 |
| JP | 2007168191 A | 7/2007 |
| JP | 2008037100 A | 2/2008 |
| JP | 2009073942 A | 4/2009 |
| JP | 2009079091 A | 4/2009 |
| JP | 2009096988 A | 5/2009 |
| JP | 2011178832 A | 9/2011 |
| JP | 2012162686 A | 8/2012 |
| JP | 2015193676 A | 11/2015 |
| JP | 2018086726 A | 6/2018 |
| JP | 2018090718 A | 6/2018 |
| WO | 02081576 A1 | 10/2002 |

OTHER PUBLICATIONS

A Decision of Rejection issued by the State Intellectual Property Office of China on Jul. 20, 2023, for Chinese counterpart application No. 202080018219.8 (9 pages).
Compendium of Chinese Chemical Industry Products, Third Edition, Second Volume, Organized by Chemical Industry Publishing House, Chemical Industry Publishing House, p. 888, Jan. 31, 2005;
Handbook of Adhesive Raw Materials, Li Guangyu et al, National Defense Industry Press, pp. 251-252, Aug. 31, 2004.
International Search Report (ISR) mailed May 12, 2020, issued for International application No. PCT/JP2020/008614. (3 pages).
Extended European Search Report (EESR) dated Nov. 7, 2022, issued for European counterpart patent application No. EP20773645.5 (7 pages).
International Preliminary Report on Patentability, dated Sep. 16, 2021, for corresponding international application PCT/JP2020/008614 (1 page).
Notification Concerning Transmittal of International Preliminary Report on Patentability, mailed Sep. 30, 2021, for corresponding international application PCT/JP2020/008614 (1 page).
Notification of Transmittal of Translation of the International Preliminary Report on Patentability, mailed Sep. 30, 2021, for corresponding international application PCT/JP2020/008614 (1 page).

(Continued)

*Primary Examiner* — Ian A Rummel
(74) *Attorney, Agent, or Firm* — Law Office of Katsuhiro Arai

(57) ABSTRACT

An object is to obtain an electron beam-curable printing ink composition that maintains such basic properties as curability, adhesion, scratch resistance, etc., without containing any traditional polymerization initiator. As a solution, an electron beam-curable printing ink composition is provided that contains dimethylpolysiloxane by 0.1 to 3.5% by mass relative to the total composition.

6 Claims, No Drawings

(56) References Cited

OTHER PUBLICATIONS

Written Opinion of the International Searching Authority, mailed May 12, 2020, for corresponding international application PCT/JP2020/008614 (6 page).
A Notice of Reasons for Refusal issued by the Japanese Patent Office on Feb. 14, 2023, for Japanese counterpart application No. 2019-048972. (7 pages).

* cited by examiner

ELECTRON BEAM-CURABLE PRINTING INK COMPOSITION AND ELECTRON BEAM-CURABLE OVERPRINT VARNISH COMPOSITION

CROSS-REFERENCE TO RELATED APPLICATIONS

This application is the U.S. National Phase under 35 U.S.C. § 371 of International Application PCT/JP2020/008614, filed Mar. 2, 2020, which claims priority to Japanese Patent Application No. JP2019-048972, filed Mar. 15, 2019. The International Application was published under PCT Article 21(2) in a language other than English.

TECHNICAL FIELD

The present invention relates to an electron beam-curable printing ink composition and an electron beam-curable overprint varnish composition.

BACKGROUND ART

Efforts are underway in various industries and sectors to reduce environmental impact from various angles, with the goal of protecting the global environment. For example, volatile organic compounds (VOCs) contained in paints, inks, etc., are chemical substances that cause global warming and are therefore subject to the efforts to reduce environmental impact through voluntary regulation/reduction of the use of VOCs.

In the interest of reducing VOCs, utilization of active energy ray-curable printing ink compositions that cure under ultraviolet ray, electron beam, and other active energy rays is being studied. Active energy ray-curable printing ink compositions contain polymerizable compounds that polymerize when irradiated with active energy rays, and a polymerization initiator, etc., that expresses polymerization initiation function when irradiated with active energy rays.

Active energy ray-curable compositions can reduce environmental impact because they help curb the amounts of VOCs used and consequently eliminate or reduce the amounts of VOCs volatilizing into the air. Furthermore, their ability to cure quickly (quick drying property) allows for energy saving and productivity improvement, which is why active energy ray-curable compositions have been practical choices for use in paints and printing ink compositions.

In the printing industry, printed matters that have been printed by various methods require that the surface inks are dried sufficiently, because otherwise the inks will transfer to the back side of the printed matters when stacked, or attach to fingers, etc., that come in contact with the printed matters. As a result, printed matters cannot be forwarded for post-processing or distributed as products until they are sufficiently dry. This explains the growing popularity of active energy ray-curable inks that can be cured (dried) instantly on the surface of printed matters when the printed matters are irradiated with an active energy ray immediately after printing.

Such active energy ray-curable inks are widely known, as described in Patent Literature 1 and Patent Literature 2, for example.

Furthermore, active energy ray-curable printing ink compositions are the target of various measures designed to reduce environmental impact. Examples of measures include, for example, development of products that can be cured (dried) with fewer doses of active energy ray irradiation, and replacement of high-pressure mercury lamps, etc., that consume a lot of power and cause ozone to generate at short UV wavelengths, with UV LED lamps and low-output UV lamps that are energy-efficient and reduce ozone generation.

In addition, while reducing the use quantity of polymerization initiator is preferred for an ink composition in some cases, a common practice is that, as mentioned above, active energy ray-curable printing ink compositions are formulated to contain a polymerization initiator having a property to generate radicals extremely easily.

For example, it is known that, as described in Patent Literature 1, UV-curable inkjet ink compositions must have a photopolymerization initiator compounded therein, and any of various types of surfactants including unmodified silicone oils, modified silicone oils, and various other silicone-based surfactants can be compounded as an optional component.

Also, as described in Patent Literature 2, UV-curable inkjet ink compositions must have a photopolymerization initiator compounded therein, and any of various types of surfactants including modified silicone oils and various other silicone-based surfactants, which are not unmodified silicone oils, can be compounded as an optional component.

And, no active energy ray-curable printing ink composition has yet been put to commercial use that contains no such polymerization initiator and is suitable for a wide range of printing methods, compositions and applications.

BACKGROUND ART LITERATURE

Patent Literature

Patent Literature 1: Japanese Patent Laid-open No. 2011-178832
Patent Literature 2: Japanese Patent Laid-open No. 2018-86726

SUMMARY OF THE INVENTION

Problems to be Solved by the Invention

The present invention was made in light of the aforementioned situation, and its object is to obtain an electron beam-curable printing ink composition that maintains such basic properties as curability, adhesion, scratch resistance, etc., without containing any traditional polymerization initiator.

Means for Solving the Problems

The inventors of the present invention found that the aforementioned object could be achieved by an electron beam-curable printing ink composition and an electron beam-curable overprint varnish composition, as described below, and completed the present invention as follows:

1. An electron beam-curable printing ink composition that contains dimethylpolysiloxane by 0.1 to 3.5% by mass relative to the total composition.
2. The electron beam-curable printing ink composition according to 1, that contains no polymerization initiator.
3. The electron beam-curable printing ink composition according to 1 or 2, that contains, as a curable resin, one or more types selected from monomers, oligomers, and polymers, which have unsaturated bonds.

4. An overprint varnish composition that contains dimethylpolysiloxane by 0.1 to 3.5% by mass relative to the total composition.

5. The overprint varnish composition according to 4, that contains no polymerization initiator.

6. The overprint varnish composition according to 4 or 5, that contains, as a curable resin, one or more types selected from monomers, oligomers, and polymers, which have unsaturated bonds.

Effects of the Invention

According to the present invention, an electron beam-curable printing ink composition can be obtained that maintains such basic properties as curability, adhesion, scratch resistance, etc., without containing any photopolymerization initiator or other polymerization initiator, and it can also have a higher ratio of biomass-derived raw materials. In addition, any drop in the stability of such ink composition that would otherwise be caused by a polymerization initiator contained therein can be prevented.

Also, such ink composition can demonstrate excellent laminatability when used in laminating applications.

MODE FOR CARRYING OUT THE INVENTION

The electron beam-curable printing ink composition proposed by the present invention, as described below, is used in the same applications as the applications in which traditional printed matters are used.

Just like general printing inks, the electron beam-curable printing ink composition proposed by the present invention contains a resin component, a pigment, additives, and if necessary, a solvent, etc. Just like general overprint varnish compositions, the overprint varnish composition proposed by the present invention also contains a resin component, and if necessary, a solvent, etc.

And, as a printing ink, the present invention can be applied to any printing method, adoptable for flexographic, gravure, inkjet, or any other known method that uses ink compositions curing under irradiation with an electron beam. Also, it can be used with any printing media without limitation.

Also, as an overprint varnish composition, the present invention can be applied to any printing method.

It should be noted that the "electron beam-curable overprint varnish composition" and "electron beam-curable printing ink composition" are sometimes collectively referred to simply as "ink composition."

Also, "in the solids content" means in the total solids content including curing components that have cured as a result of electron beam irradiation, as well as components that are solid or in solid solution state before curing.

Furthermore, the resin composition is not specified in any way, which means that a ratio of biomass-derived raw materials can be aggressively increased.

[Curable Resin]

For the resin component to be contained in the electron beam-curable printing ink composition and overprint varnish composition proposed by the present invention, one or more types selected from the following three types including monomers, oligomers, and polymers, all with unsaturated bonds and all forming a resin when cured, can be used.

Such curable resin accounts for preferably 20% by mass or more, or more preferably 30% by mass or more, or yet more preferably 40% by mass or more, in the solids content of the electron beam-curable printing ink composition. Also, it accounts for preferably no more than 80% by mass, or more preferably no more than 70% by mass, or yet more preferably no more than 60% by mass, in the solids content. If the content is under 20% by mass, the curability of the electron beam-curable printing ink composition as a whole may worsen, while a content exceeding 80% by mass may reduce the ease of handling of the resulting ink or overprint varnish.

It should be noted, however, that the curable resin must be a resin component that can undergo a radical polymerization reaction with the radicals generated by an electron beam, and any of the following may be adopted, for example.

(Monomers)

Monomers are components with ethylenic unsaturated bonds that polymerize and increase in molecular weight; in the pre-polymerization state, however, these components are oftentimes liquid and relatively low in molecular weight. Monomers serve as solvents in which to dissolve separately compounded resin components to produce varnishes, and are also used for the purpose of adjusting the viscosity of ink compositions.

Such monomers include monofunctional monomers having one ethylenic unsaturated bond in their molecules, as well as bifunctional or higher polyfunctional monomers having two or more ethylenic unsaturated bonds in their molecules. Bifunctional or higher polyfunctional monomers can crosslink the molecules of an ink composition as it cures, thus contributing to an increase in the curing rate or formation of a strong film. Monofunctional monomers do not have the aforementioned crosslinking capability, but it therefore contributes to a reduction in the curing shrinkage that accompanies crosslinking. Of these monomers, various types may be combined and used as necessary.

The monomer content in the curable resin is preferably 40% by mass or higher, or more preferably 60% by mass or higher, or yet more preferably 80% by mass or higher. If the content is under 40% by mass, the curability of the ink composition may drop, while a content exceeding 80% by mass may reduce the ease of handling of the resulting ink composition.

Any of the monofunctional and polyfunctional monomers mentioned below may be used alone, or two or more types may be combined. It should be noted that, in this Specification, "(meth)acrylate" means "acrylate and/or methacrylate," while "(meth)acrylic acid" means "acrylic acid and/or methacrylic acid."

For monofunctional monomers, any unsaturated carboxylic acid-based compounds, alkyl (meth)acrylate-based compounds, hydroxyl group-containing (meth)acrylate-based compounds, halogen-containing (meth)acrylate-based compounds, ether group-containing (meth)acrylate-based compounds, carboxyl group-containing (meth)acrylate-based compounds, vinyl ether group-containing (meth)acrylate-based compounds, and other (meth)acrylate-based compounds, styrene-based compounds, N-vinyl-based compounds, allylate-based compounds, and other compounds having one ethylenic unsaturated bond, may be used.

The content of the monofunctional monomers in the monomers is preferably 60% by mass or higher, or more preferably 80% by mass or higher.

—Unsaturated Carboxylic Acid-Based Compounds—

Unsaturated carboxylic acid-based compounds include, for example, (meth)acrylic acid, itaconic acid, crotonic acid, isocrotonic acid, fumaric acid, maleic acid, and other unsaturated carboxylic acids, as well as salts thereof and anhydrides thereof.

—Alkyl (Meth)Acrylate-Based Compounds—

Alkyl (meth)acrylate-based compounds include, for example, methyl (meth)acrylate, ethyl (meth)acrylate, propyl (meth)acrylate, isopropyl (meth)acrylate, n-butyl (meth)acrylate, i-butyl (meth)acrylate, t-butyl acrylate, amyl (meth)acrylate, isoamyl (meth)acrylate, hexyl (meth)acrylate, 2-ethylhexyl (meth)acrylate, octyl (meth)acrylate, decyl (meth)acrylate, dodecyl (meth)acrylate, isooctyl (meth)acrylate, lauryl (meth)acrylate, stearyl (meth)acrylate, isostearyl (meth)acrylate, isodecyl (meth)acrylate, isomyristyl (meth)acrylate, octadecyl (meth)acrylate, dicyclopentanyl (meth)acrylate, tridecyl (meth)acrylate, nonyl (meth)acrylate, hexadecyl (meth)acrylate, myristyl (meth)acrylate, isobornyl (meth)acrylate, cyclohexyl (meth)acrylate, norbornyl (meth)acrylate, dicyclopentenyl (meth)acrylate, dicyclopentenyloxyethyl (meth)acrylate, 1-adamantyl (meth)acrylate, 3,5,5-trimethylcyclohexyl acrylate, 4-t-butylcyclohexyl (meth)acrylate, benzyl (meth)acrylate, etc.

—Hydroxyl Group-Containing (Meth)Acrylate-Based Compounds—

Hydroxyl group-containing (meth)acrylate-based compounds include, for example, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, hydroxypentyl (meth)acrylate, 2-hydroxy-3-methoxypropyl (meth)acrylate, 2-hydroxy-3-butoxypropyl (meth)acrylate, diethylene glycol mono(meth)acrylate, triethylene glycol mono(meth)acrylate, polyethylene glycol mono(meth)acrylate, dipropylene glycol mono(meth)acrylate, polypropylene glycol mono(meth)acrylate, 1,6-hexanediol mono(meth)acrylate, glycerin mono(meth)acrylate, 2-hydroxy-3-chloropropyl (meth)acrylate, 2-hydroxy-3-phenoxypropyl (meth)acrylate, 2-hydroxy-3-allyloxypropyl (meth)acrylate, 2-(meth)acryloyloxyethyl-2-hydroxypropyl phthalate, 2-ethylhexyl EO-modified (meth)acrylate, o-phenylphenol EO-modified acrylate, p-cumylphenol EO-modified (meth)acrylate, nonylphenol EO-modified (meth)acrylate, and other (poly)alkylene glycol-modified (meth)acrylates, etc.

—Halogen-Containing (Meth)Acrylate-Based Compounds—

Halogen-containing (meth)acrylate-based compounds include, for example, trifluoromethyl (meth)acrylate, 2,2,2-trifluoroethyl (meth)acrylate, 2,2,3,3-tetrafluoropropyl (meth)acrylate, 1H-hexafluoroisopropyl (meth)acrylate, 1H,1H,5H-octafluoropentyl (meth)acrylate, 1H,1H,2H,2H-heptadecafluorodecyl (meth)acrylate, 2,6-dibromo-4-butylphenyl (meth)acrylate, 2,4,6-tribromophenoxyethyl (meth)acrylate, 2,4,6-tribromophenol-3-EO (ethylene oxide) adduct (meth)acrylate, etc.

—Ether Group-Containing (Meth)Acrylate-Based Compounds—

Ether group-containing (meth)acrylate-based compounds include, for example, 1,3-butylene glycol methyl ether (meth)acrylate, methoxytriethylene glycol (meth)acrylate, methoxydipropylene glycol (meth)acrylate, methoxytripropylene glycol (meth)acrylate, methoxypolypropylene glycol (meth)acrylate, ethoxydiethylene glycol (meth)acrylate, ethyl carbitol (meth)acrylate, 2-ethylhexyl carbitol (meth)acrylate, tetrahydrofurfuryl (meth)acrylate, cresylpolyethylene glycol (meth)acrylate, 2-(vinyloxyethoxy)ethyl (meth)acrylate, phenoxyethyl (meth)acrylate, p-nonylphenoxyethyl (meth)acrylate, p-nonylphenoxypolyethylene glycol (meth)acrylate, glycidyl (meth)acrylate, phenoxydiethylene glycol (meth)acrylate, phenoxy-polyethylene glycol (meth)acrylate, hexaethylene glycol monophenyl ether mono(meth)acrylate, diethylene glycol monobutyl ether acrylate, dipropylene glycol monomethyl ether (meth)acrylate, 3-methoxybutyl (meth)acrylate, methoxydiethylene glycol (meth)acrylate, methoxypropylene glycol (meth)acrylate, methoxypolyethylene glycol (meth)acrylate (number of EO repeating units being 400, 700, etc.), 2-(2-ethoxyethoxy)ethyl (meth)acrylate, 2-ethoxyethyl (meth)acrylate, 2-methoxyethyl (meth)acrylate, 3-methoxybutyl acrylate, ethoxyethyl acrylate, ethoxyethoxyethyl (meth)acrylate, butoxyethyl (meth)acrylate, alkoxylated 2-phenoxyethyl (meth)acrylate (ethoxylated 2-phenoxyethyl (meth)acrylate, propoxylated 2-phenoxyethyl (meth)acrylate, etc.), alkoxylated nonylphenyl (meth)acrylate (ethoxylated (4) nonylphenol acrylate, etc.), 2-phenoxyethyl (meth)acrylate, paracumylphenoxyethylene glycol (meth)acrylate, methylphenoxyethyl acrylate, ethoxylated succinic acid (meth)acrylate, ethoxylated tribromophenyl acrylate, ethoxylated nonylphenyl (meth)acrylate, and other alkoxy and/or phenoxy-based (meth)acrylates, etc.

—Carboxyl Group-Containing (Meth)Acrylate-Based Compounds—

Carboxyl group-containing (meth)acrylate-based compounds include, for example, β-carboxylethyl (meth)acrylate, succinic acid monoacryloyloxyethyl ester, ω-carboxy-polycaprolactone mono(meth)acrylate, 2-(meth)acryloyloxyethyl hydrogen phthalate, 2-(meth)acryloyloxypropyl hydrogen phthalate, 2-(meth)acryloyloxypropyl hexahydro-hydrogen phthalate, 2-(meth)acryloyloxypropyl tetrahydro-hydrogen phthalate, etc.

—Vinyl Ether Group-Containing (Meth)Acrylate-Based Compounds—

Vinyl ether group-containing (meth)acrylate-based compounds include, for example, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 3-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 5-vinyloxypentyl (meth)acrylate, 6-vinyloxyhexyl (meth)acrylate, 4-vinyloxymethylcyclohexylmethyl (meth)acrylate, 3-vinyloxymethlycyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, etc.

—Other (Meth)Acrylate-Based Compounds—

Other (meth)acrylate-based compounds include, for example, N,N-dimethylaminoethyl (meth)acrylate, N,N-dimethylaminopropyl (meth)acrylate, morpholinoethyl (meth)acrylate, trimethylsiloxyethyl (meth)acrylate, diphenyl-2-(meth)acryloyloxyethyl phosphate, 2-(meth)acryloyloxyethyl acid phosphate, caprolactone-modified 2-(meth)acryloyloxyethyl acid phosphate, 2-hydroxy-1-(meth)acryloxy-3-methacryloxypropane, acryloyloxyethyl phthalate, 2-(meth)acryloyloxyethyl-2-hydroxyethyl phthalate, 2-(meth)acryloyloxypropyl phthalate, tricyclodecane monomethylol(meth)acrylate, (meth)acrylic acid dimer, diethylaminoethyl (meth)acrylate, 2-(meth)acryloyloxyethyl succinic acid, 2-(meth)acryloyloxyethyl hexahydrophthalic acid, 2-ethylhexyl-diglycol (meth)acrylate, aminoethyl (meth)acrylate, ethyl carbitol acrylate, ethyl diglycol acrylate, quaternary salt of dimethylaminoethyl acrylate benzyl chloride, tribromophenyl (meth)acrylate, 1,4-cyclohexanedimethanol mono(meth)acrylate, cresol (meth)acrylate, trimethylolpropane formal (meth)acrylate, neopentyl glycol (meth)acrylic acid benzoate ester, (2-methyl-2-ethyl-1,3-dioxolan-4-yl)methyl (meth)acrylate, 1-(meth)acryloyl piperidin-2-one, 1,4-dioxaspiro[4,5]deci-2-ylmethyl 2-(meth)acrylate, N-(meth)acryloyloxyethyl hexahydrophthalimide, γ-butyrolactone (meth)acrylate, caprolactone-modified tetrahydro-furfuryl acrylate, imide acrylate, vinyl (meth)acrylate, maleimide, etc.

—Styrene-Based Compounds—

Styrene-based compounds include, for example, styrene, vinyl toluene, p-hydroxystyrene, p-chlorostyrene, p-bromostyrene, p-methylstyrene, p-methoxystyrene, p-t-butoxystyrene, p-t-butoxycarbonylstyrene, p-t-butoxycarbonyloxystyrene, 2,4-diphenyl-4-methyl-1-pentene, divinylbenzene, etc.

—N-Vinyl-Based Compounds—

N-vinyl-based compounds include, for example, N-vinyl pyrrolidone, N-vinyl formamide, N-vinyl acetoamide, N-vinyl-2-caprolactam, N-vinyl carbazole, etc.

—Allylate-Based Compounds—

Allylate-based compounds include, for example, allyl glycidyl ether, diallyl phthalate, triallyl trimellitate, isocyanuric acid triallylate, etc.

—Other Compounds Having One Ethylenic Unsaturated Bond—

As a compound having one ethylenic unsaturated bond, any of "other compounds having one ethylenic unsaturated bond" excluding the aforementioned compounds, may be used.

Such compounds include, for example, vinyl acetate, vinyl monochloroacetate, vinyl benzoate, vinyl pivalate, vinyl butylate, vinyl laurate, divinyl adipate, vinyl crotonate, vinyl 2-ethylhexanoate, three-membered ring compounds (such as vinyl cyclopropanes, 1-phenyl-2-vinylcyclopropanes, 2-phenyl-3-vinyloxiranes, 2,3-divinyloxiranes, etc.), cyclic ketene acetals (such as 2-methylene-1,3-dioxepane, polydioxolanes, 2-methylene-4-phenyl-1,3-dioxepane, 4,7-dimethyl-2-methylene-1,3-dioxepane, 5,6-benzo-2-methylene-1,3-dioxepane, etc.), etc.

For bifunctional or higher polyfunctional monomers (compounds having two ethylenic unsaturated bonds), any known compounds having two or more ethylenic unsaturated bonds, such as the following, may be used:

Bifunctional monomers, such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, butylene glycol di(meth)acrylate, pentyl glycol di(meth)acrylate, neopentyl glycol di(meth)acylate, hydroxypivalyl hydroxypivalate di(meth)acrylate, hydroxypivalyl hydroxypivalate dicaprolactonate di(meth)acrylate, 1,6-hexanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth)acrylate, 1,12-dodecanediol di(meth) acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethylol octane di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2-butyl-2-ethyl-1,3-propanediol di(meth)acrylate, 2,4-diethyl-1,5-pentanediol di(meth)acrylate, pentane di(meth)acrylate, tricyclodecane dimethylol di(meth)acrylate, tricyclodecane dimethylol dicaprolactonate di(meth)acrylate, cyclohexanedimethanol di(meth)acrylate, dicyclopentanyl di(meth)acrylate, bisphenol A tetraethylene oxide adduct di(meth)acrylate, bisphenol F tetraethylene oxide adduct di(meth)acrylate, bisphenol S tetraethylene oxide adduct di(meth)acrylate, hydrogenated bisphenol A tetraethylene oxide adduct di(meth)acrylate, hydrogenated bisphenol F tetraethylene oxide adduct di(meth)acrylate, hydrogenated bisphenol A di(meth)acrylate, hydrogenated bisphenol F di(meth)acrylate, bisphenol A tetraethylene oxide adduct dicaprolactonate di(meth)acrylate, bisphenol F tetraethylene oxide adduct dicaprolactonate di(meth)acrylate, and di(meth)acrylates of glycerin, pentaerythritol, diglycerin, ditrimethylolpropane, dipentaerythritol, and other polyalcohols, etc.;

trifunctional monomers, such as glycerin tri(meth)acrylate, trimethylolpropane tri(meth)acrylate, trimethylolpropane tricaprolactonate tri(meth)acrylate, trimethylolethane tri(meth)acrylate, trimethylolhexane tri(meth)acrylate, trimethyloloctane tri(meth)acrylate, pentaerythritol tri(meth)acrylate, etc.;

tetrafunctional or higher polyfunctional monomers, such as trimethylolpropane tetra(meth)acrylate, pentaerythritol tetra(meth)acrylate, pentaerythritol tetracaprolactonate tetra(meth)acrylate, diglycerin tetra(meth)acrylate, ditrimethylolpropane tetra(meth)acrylate, ditrimethylolpropane tetracaprolactonate tetra(meth)acrylate, ditrimethylolethane tetra(meth)acrylate, ditrimethylolbutane tetra(meth)acrylate, ditrimethylolhexane tetra(meth)acrylate, ditrimethylolloctane tetra(meth)acrylate, dipentaerythritol penta(meth)acrylate, dipentaerythritol hexa(meth)acrylate, tripentaerythritol hexa(meth)acrylate, tripentaerythritol hepta(meth)acrylate, tripentaerythritol octa(meth)acrylate, tripentaerythritol polyalkylene oxide hepta(meth)acrylate, etc.; and the like. Among these, trimethylolpropane triacrylate (TMPTA; trifunctional), ditrimethylolpropane tetraacrylate (DITMPTA; tetrafunctional), dipentaerythritol hexaacrylate (DPHA; hexafunctional), glycerin propoxy triacrylate (GPTA; trifunctional), hexanediol diacrylate (HDDA; bifunctional), etc., are preferred.

(Oligomers)

Oligomers are components that increase in molecular weight when the ethylenic unsaturated bonds in their molecules polymerize. As they are relatively-high-molecular-weight components to begin with, oligomers are also used for the purpose of adding appropriate viscosity and elasticity to ink compositions. Additionally, oligomers have relatively high polarity and thus are expected to add adhesive property on nonabsorbent media, to cured ink compositions.

The oligomer content in the curable resin is preferably 20% by mass or lower, or more preferably 10% by mass or lower, or yet more preferably 0 to 10% by mass. If the content exceeds 20% by mass, the ease of handling of the ink composition may drop.

These oligomers include, for example: epoxy-modified (meth)acrylates and rosin-modified epoxy acrylates, examples of which include esters of the hydroxyl groups produced after the epoxy groups contained in epoxy resins and other epoxy compounds have been ring-opened with acids and bases, and (meth)acrylic acids; polyester-modified (meth)acrylates, examples of which include esters of the terminal hydroxyl groups in polycondensates comprising dibasic acids and diols, and (meth)acrylic acids; polyether-modified (meth)acrylates, examples of which include esters of the terminal hydroxyl groups in polyether compounds, and (meth)acrylic acids; and urethane-modified (meth)acrylates, examples of which include esters of the terminal hydroxyl groups in condensates comprising polyisocyanate compounds and polyol compounds, and (meth)acrylic acids.

Such polymers or oligomers with ethylenic unsaturated bonds include, for example, polydiallyl phthalate, neopentyl glycol oligo(meth)acrylate, 1,4-butanediol oligo(meth)acrylate, 1,6-hexanediol oligo(meth)acrylate, trimethylol propane oligo(meth)acrylate, pentaerythritol oligo(meth)acrylate, urethane (meth)acrylate, epoxy(meth)acrylate, polyester (meth)acrylate, rosin-modified epoxy(meth)acrylate, unsaturated polyesters, polyether (meth)acrylate, acrylic-based resins having unreacted unsaturated groups, unsaturated polyethers, unsaturated polyamides, unsaturated polyurethanes, acrylic-modified phenol-based resins, acrylated amine compound oligomers, etc.

These oligomers are commercially available and may be obtained under the product names of, for example, the "EBECRYL" series manufactured by Daicel-Cytec Co., Ltd., "CN" and "SR" series manufactured by Sertomer Company Inc., "Aronix M-6000" series, "7000" series, "8000" series, "Aronix M-1100," "Aronix M-1200", and "Aronix M-1600" manufactured by Toagosei Co., Ltd., "NK Ester" and "NK Oligo" manufactured by Shin-Nakamura Chemical Co., Ltd., "Light Acrylate," "Light Ester," "Epoxy Ester," "Urethane Acrylate", and "High-functional Oligomer" series manufactured by Kyoeisha Chemical Co., Ltd., "Special Acrylic Monomer" series manufactured by Osaka Organic Chemical Industry Ltd., "Acryester" and "Diabeam Oligomer" series manufactured by Mitsubishi Rayon Co., Ltd., "Kayarad" and "Kayamer" series manufactured by Nippon Kayaku Co., Ltd., "(Meth)acrylic Acid/Methacrylic Acid Ester Monomer" series manufactured by Nippon Shokubai Co., Ltd., "Nichigo-UV Shikoh Urethane Acrylate Oligomer" series manufactured by Nippon Synthetic Chemical Industry Co., Ltd., "Carboxylic Acid Vinyl Ester Monomer" series manufactured by Shin-Etsu Vinyl Acetate Co., Ltd., "Functional Monomer" series manufactured by Kohjin Co., Ltd., "EBECRYL," "ACA," "KRM," "IRR," "RDX", and "OTA" series manufactured by Daicel-Allnex Ltd., "CN" and "SR" series manufactured by Arkema S.A., "Laromer" series manufactured by BASF SE, "Photomer" series manufactured by Cognis Corporation, "Art Resin" series manufactured by Negami Chemical Industrial Co., Ltd., "Blemmer" series manufactured by NOF Corporation, "New Frontier" series manufactured by DKS Co., Ltd., "Miramer" series manufactured by Miwon Specialty Chemical Co., Ltd., "AgiSyn" series manufactured by DSM-Agi Corporation, etc.

Also, in consideration of the environmental aspect, polyurethane oligomers and/or polyurethane polyurea oligomers made from polyester polyols obtained using plant-based dicarboxylic acid components and diol components, may be adopted.

For plant oil-modified polyfunctional polyesters acrylate oligomers, any plant oil-modified polyester acrylate oligomers having two to six acrylate groups in their molecules may be used without limitation.

Among these, preferably one or more types selected from the group that consists of EBECRYL 450, 452, 820, 1622, and hexafunctional polyester acrylates modified with tall oil fatty acids (such as AgiSyn 716, etc.) may be used, because this can increase the biomass content of the electron beam-curable printing ink composition.

Any of these oligomers may be used alone, or two or more types may be combined.

(Polymers)

Polymers with ethylenic unsaturated bonds are components that increase in molecular weight together with the aforementioned monomers and oligomers, and because they already have high molecular weight before any active energy ray is irradiated, these components are helpful in improving the viscoelasticity of ink compositions. These polymers are used in a dissolved or dispersed state in monomers constituting low-viscosity liquids, for example. Polymers with ethylenic unsaturated bonds include polydiallyl phthalate, acrylic resins having unreacted unsaturated groups, acryl-modified phenol resins, etc. Among these, preferably polydiallyl phthalate is used as it demonstrates superior compatibility with the aforementioned monomers and oligomers.

Also, the content of the polymer with ethylenic unsaturated bonds is preferably 0 to 50% by mass, or more preferably 0 to 30% by mass, or yet more preferably 0 to 20% by mass. In the case of printing that uses plates, keeping the polymer content within the aforementioned ranges adds appropriate viscoelasticity to the ink composition to prevent the occurrence of misting, etc., while ensuring good curability of the ink composition, which is desired.

The content of one or more types of compounds selected from monomers, oligomers, and polymers with unsaturated bonds, in the ink composition, is preferably 20% by mass or higher, or more preferably 30% by mass or higher, or yet more preferably 40% by mass or higher, in the solids content of the electron beam-curable printing ink composition. Also, it is preferably 80% by mass or lower, or more preferably 70% by mass or lower, or yet more preferably 60% by mass or lower, in the solids content. If the content is under 20% by mass, the curability of the curable printing ink composition as a whole may worsen, while a content exceeding 80% by mass may lead to poor ease of handling, printability and applicability of the resulting ink or overprint varnish.

[Dimethylpolysiloxane]

Dimethylpolysiloxane used under the present invention is unmodified and considered extremely stable chemically, and has a property of being oxidized at high temperature.

An unmodified dimethylpolysiloxane has a structure in which dimethylsiloxane units are polymerized. Such unmodified dimethylsiloxane has a structure expressed by the formula below. The formula below indicates that the molecular weight varies according to the value of n; under the present invention, however, any unmodified dimethylpolysiloxane of this structure may be used, regardless of the value of n, so long as the structure has no functional groups.

Also, the unmodified dimethylpolysiloxane may be of a straight-chain type as shown in the formula below, where n in the formula below is preferably 3 to 30, or more preferably 4 to 20.

Furthermore, it may be octamethylcyclotetrasiloxane, decamethylcyclopentasiloxane, dodecamethylcyclohexasiloxane, or other cyclic dimethylpolysiloxane.

Under the present invention, dimethylpolysiloxane is contained by 0.1% by mass or more, or preferably 0.3% by mass or more, or more preferably 0.5% by mass or more, while it is contained by no more than 3.5% by mass, or preferably no more than 3.0% by mass, or yet more preferably no more than 2.5% by mass, relative to the total ink composition and overprint varnish composition.

If the content is under 0.1% by mass, sufficient curing cannot be achieved.

If dimethylpolysiloxane is contained by more than 3.5% by mass, some may remain separated in the printed ink composition, in which case the dimethylpolysiloxane on the surface will not contribute to the curing of the ink composition. Also, the separated dimethylsiloxane may peel from the coating film surface, or contaminate other articles that may come in contact, before or after curing.

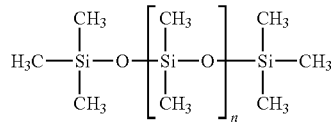

Modified polysiloxanes having a structure in which the constituent groups have been replaced by hydroxyl groups, amino groups, (poly)ether groups, epoxy groups, carboxy groups, carbinol groups, mercapto groups, phenol groups, ester groups, alkoxy groups, halogen atom, aralkyl groups, long-chain alkyl groups, higher fatty acid ester-groups, higher aliphatic amide groups, etc., which are not the aforementioned unmodified dimethylpolysiloxanes, are different from the unmodified dimethylpolysiloxane under the present invention in that they do not have the action of curing together with polymerizable monomers, etc., when irradiated with an electron beam.

Nevertheless, these modified polysiloxanes may be added to the extent that the effects of the present invention will not be impaired.

[Photopolymerization Initiator]

Photopolymerization initiators are components that generate radicals when active energy ray irradiation is received, and allow ink compositions and overprint varnish compositions to cure as the generated radicals polymerize the aforementioned compounds with ethylenic unsaturated bonds contained therein. Even if no photopolymerization initiator is contained in them, the ink composition and overprint varnish composition proposed by the present invention will still polymerize and cure when irradiated with an electron beam.

If, however, a photopolymerization initiator is to be contained, any of the photopolymerization initiators that generate radials when irradiated with an electron beam, such as the following, for example, may be used without limitation:

One or more types selected from the group that consists of acylphosphine oxide-based compounds, triazine-based compounds, aromatic ketone-based compounds, aromatic onium salt-based compounds, organic peroxides, thioxanthone-based compounds, thiophenyl-based compounds, anthracene-based compounds, hexaallyl biimidazole-based compounds, ketoxime ester-based compounds, borate-based compounds, azinium-based compounds, metallocene-based compounds, active ester-based compounds, halogenated hydrocarbon-based compounds, alkylamine-based compounds, iodonium salts, sulfonium salts, etc.

To be specific, photopolymerization initiators include benzophenone, diethylthioxanthone, 2-methyl-1-(4-methylthio)phenyl-2-morpholinopropane-1-one, 4-benzoyl-4'-methyldiphenyl sulfide, 1-chloro-4-propoxythioxanthone, isopropylthioxanthone, 2-hydroxy-2-methyl-1-phenylpropane-1-one, 1-hydroxycyclohexylphenylketone, bis-2,6-dimethoxybenzoyl-2,4,4-trimethylpentylphosphine oxide, 1-[4-(2-hydroxyethoxy)-phenyl]-2-hydroxy-2-methyl-1-propane-1-one, 2,2-dimethyl-2-hydroxyacetophenone, 2,2-dimethoxy-2-phenylacetophenone, 2,4,6-trimethylbenzyl-diphenylphosphine oxide, 2-benzyl-2-dimethylamino-1-(morpholinophenyl)-butane-1-one, etc. These photopolymerization initiators are commercially available and may be obtained under the product names of, for example, IRGACURE 907, IRGACURE 369, IRGACURE 184, IRGACURE 379, IRGACURE 819, TPO, etc., manufactured by BASF SE, and DETX, etc., manufactured by Lamberti S.P.A. Any one of these photopolymerization initiators may be used alone, or two or more types may be combined.

If a photopolymerization initiator is to be contained in the ink composition and overprint varnish composition, its content must be in a range where the effects of adding dimethylpolysiloxane will not be impaired, which is only around 0.01 to 2.0% by mass, or preferably 0.02 to 0.5% by mass. Keeping the content of the photopolymerization initiator in the ink composition and overprint varnish composition within the aforementioned range promotes a simultaneous achievement, by the ink composition and overprint varnish composition, of sufficient curability along with good internal curability and cost, which is desired.

[Coloring Component]

A coloring component may be added, as necessary, to the ink composition proposed by the present invention. Coloring components represent components that are added for the purpose of adding coloring power, concealing power, etc., to the ink composition, and include coloring pigments, white pigments, metal powders, etc. Such coloring components encompass, without limitation, all those that have been traditionally used in ink compositions, such as the following organic and/or inorganic pigments, for example.

It should be noted that the overprint varnish composition proposed by the present invention need not contain any coloring component because it is a composition applied on a printed surface.

Coloring components include dye lake pigments, azo-based, benzimidazolone-based, phthalocyanine-based, quinacridone-based, anthraquinone-based, dioxazine-based, indigo-based, thioindigo-based, perylene-based, perinone-based, diketopyrrolopyrrole-based, isoindolinone-based, nitro-based, nitroso-based, flavanthrone-based, quinophthalone-based, pyranthrone-based, and indanethrone-based pigments, as well as various inorganic pigments, and the like.

Among these pigments, disazo yellows (Pigment Yellow 12, Pigment Yellow 13, Pigment Yellow 14, Pigment Yellow 17, Pigment Yellow 1), Hansa yellow, and other yellow pigments, Brilliant Carmine 6B, Lake Red C, watching red, and other magenta pigments, phthalocyanine blue, phthalocyanine green, alkali blue, and other cyan pigments, titanium oxide, red iron oxide, antimony red, cadmium yellow, cobalt blue, Prussian blue, ultramarine blue, iron black, chrome oxide green, carbon black, graphite, and other colored pigments (including white, black, and other achromatic coloring pigments), as well as aluminum paste, bronze powder, and other metal powders, etc., are given as examples.

The content of the coloring component is not limited in any way, although one example is approx. 8 to 30% by mass relative to the total ink composition according to the desired degree of coloring. It should be noted that, when preparing a colored ink composition, it is possible to combine coloring components of other colors, or add ink compositions of other colors, as complementary colors.

(Pigment Dispersant/Pigment Dispersing Resin)

If the electron beam-curable printing ink composition proposed by the present invention adopts a pigment as a colorant, a pigment dispersant and/or pigment dispersing resin may be compounded.

For the pigment dispersant, one or more types selected from the group that consists of known nonionic surfactants, anionic surfactants, cationic surfactants, and amphoteric surfactants may be used.

Among these surfactants, one or more types selected from the group that consists of silicon-based surfactants (such as polyether-modified silicon oils, polyester-modified polydimethyl siloxanes, polyester-modified methyl alkyl polysiloxanes, etc.), fluorine-based surfactants, oxyalkylene ether-based surfactants, acetylene glycol-based surfactants, phosphorus-based surfactants, sulfonic acid-based surfactants, etc., may be used, for example.

Also, for the pigment dispersing resin, one or more types selected from the group that consists of polymeric dispersants (such as carbodiimide-based, polyester-based, polyamine-based, polyester amine-based, polyurethane-based, and fatty acid amine-based dispersants, as well as polyacrylate-based, polycaprolactone-based, polysiloxane-based, multichain-type polymeric nonionic, and polymeric ionic dispersants, etc.), and the like, may be used.

If the electron beam-curable printing ink composition proposed by the present invention contains a pigment dispersant or pigment dispersing resin, preferably it is contained by 1 to 200% by mass relative to the total quantity of all pigments used that represents 100% by mass.

[Other Components]

In addition to the aforementioned components, other components may be added, as necessary, to the electron beam-curable printing ink composition and overprint varnish composition proposed by the present invention. Components that are necessary according to the printing method and application method may also be added. Such components include extender pigment, non-curable resin component, polymerization inhibitor, dispersant, phosphoric acid salt or other salt, PTFE, polyethylene-based wax, olefine-based wax, Fischer-Tropsch wax, or other wax, defoaming agent, alcohol, and plant oil, mineral oil, or other oil component, for example.

Extender pigments are components for adding appropriate printability, viscoelasticity, and other properties to ink compositions and overprint varnish compositions, among which various types normally used in the preparation of ink compositions may be used. Examples of such extender pigments include clay, kaolinite (kaolin), barium sulfate, magnesium sulfate, calcium carbonate, silicon oxide (silica), bentonite, talc, mica, titanium oxide, etc. The additive quantity of any such extender pigment is approx. 0 to 33% by mass relative to the total ink composition as an example; however, it is not limited in any way.

Non-curable resin components are components that contribute to the adding of appropriate printability, viscoelasticity, and other properties to the electron beam-curable printing ink composition and overprint varnish composition proposed by the present invention, and they do not have unsaturated bonds that contribute to polymerization. Such resin components include various resins traditionally used in the applications of printing ink compositions and overprint varnish compositions.

Preferably the non-curable resin component is compatible with the aforementioned monomers and oligomers, and one or more types selected from the group that consists of styrene-acrylic resin, acrylic resin, styrene-maleic acid resin, polyester resin, alkyd resin, rosin-modified phenol resin, rosin-modified maleic acid resin, rosin-modified alkyd resin, rosin-modified petroleum resin, rosin ester resin, phenol resin, rosin resin, block polymer, graft polymer (core-shell polymer), acrylic-modified phenol resin, petroleum resin-modified phenol resin, plant oil-modified alkyd resin, fatty acid-modified rosin resin, terpene phenol resin, petroleum resin, hydrocarbon resin (polybutene, polybutadiene, etc.), fluororesin (tetrafluoroethylene (PTFE) resin wax, etc.), etc., may be used. Among these, rosin-modified maleic acid resin and terpene phenol resin are preferred from the viewpoint of adhesion.

Styrene-acrylic resins are copolymers of styrene and acrylic acid esters, and various commercially available types may be used. If a styrene-acrylic resin is to be used, a simple way is to dissolve the styrene-acrylic resin in solid state in the aforementioned monomers to produce a varnish, and then add this varnish during the preparation of the ink composition and overprint varnish composition. In this case, the content of the styrene-acrylic resin in the varnish should be determined as deemed appropriate in consideration of the ease of handling, etc.; however, one example is approx. 5 to 50% by mass.

Particularly preferably one or more types selected from the group that consists of acrylic-based resin (acrylic acid ester-styrene copolymer-based resin, etc.), styrene-based resin (styrene-acrylic acid ester copolymer-based resin, etc.), rosin-modified phenol-based resin, rosin-modified maleic acid-based resin, rosin-modified alkyd-based resin, rosin ester-based resin, fatty acid-modified rosin-based resin, alkyd-based resin, and plant oil-modified alkyd-based resin, may be used.

Among these resins, one with a weight-average molecular weight of 500 to 300,000 is preferred. Also, preferably its acid value is 1 to 100 mgKOH/g from the viewpoint of, for example, achieving quick drying property when irradiated with an active energy ray.

The content of this resin in the solids content of the electron beam-curable printing ink composition is kept preferably to no higher than 80% by mass, or more preferably to no higher than 60% by mass, or yet more preferably to no higher than 50% by mass. Also, this content is kept preferably to 30% by mass or higher, or more preferably to 40% by mass or higher. Keeping it within 30 to 80% by mass adds appropriate viscoelasticity to the ink composition to prevent the occurrence of misting, etc., without reducing the good curability of the ink composition under an electron beam, which is desired. In the electron beam-curable printing ink composition under the present invention, fatty acid-modified rosin-based resin or rosin-modified alkyd resin may be used, as a resin, to improve the biomass content and other properties.

Any known polymerization inhibitor may be contained in the electron beam-curable printing ink composition for the purpose of preventing polymerization during its storage. Preferred examples of polymerization inhibitors include butylhydroxytoluene and other phenol compounds, as well as tocopherol acetate, nitrosamine, benzotriazole, hindered amine, etc., among which butylhydroxytoluene is a more preferred example. By adding such polymerization inhibitor, a thickening of the ink composition during storage due to a progress of polymerization reaction can be prevented. The content of the polymerization inhibitor in the ink composition and overprint varnish composition is approx. 0.1 to 1% by mass, as an example.

However, the electron beam-curable printing ink composition need not contain any polymerization inhibitor if it contains no traditional polymerization initiator.

Dispersants are used to allow coloring components and extender pigments contained in ink compositions to disperse into a favorable state. Various types of these dispersants are commercially available, including, for example, the DISPERBYK (product name) series manufactured by BYK Japan KK, for example.

Any traditionally known method may be applied to manufacture the ink composition proposed by the present invention using the aforementioned components. An example of such method is to mix the aforementioned components and then knead the mixture in a bead mill, triple roll mill, etc., to disperse the pigment (i.e., coloring component and extender pigment), followed by adding of additives (polymerization inhibitor, alcohol, wax, etc.) as necessary, and further by viscosity adjustment through addition of the aforementioned monomer component and oil component.
(Wax)

For the wax, one traditionally used in printing inks and having an average particle size of 8.0 μm or smaller in the interest of improving scratch resistance, may be used.

To be specific, any of beeswax, lanoline wax, whale wax, candelilla wax, carnauba wax, rice wax, sumac wax, jojoba oil, and other animal or plant-based waxes, montan wax, ozocerite, ceresin, paraffin wax, microcrystalline wax, petrolatum, and other mineral or petroleum-based waxes, Fischer-Tropsch wax, polyethylene wax, oxidized polyethylene wax, oxidized polypropylene wax, and other synthetic hydrocarbon-based waxes, montan wax derivative, paraffin wax derivative, microcrystalline wax derivative, and other modified waxes, hardened castor oil, hardened castor oil derivative, and other hydrogenated waxes, polytetrafluoroethylene wax, etc., with an average particle size of 8.0 μm or smaller, or preferably 6.0 μm or smaller, or more preferably 4.0 μm or smaller, or yet more preferably 1.0 to 2.0 μm from the viewpoint of scratch resistance, may be used.

Among these, polytetrafluoroethylene wax and polyethylene wax are favorable from the viewpoint of friction resistance.

An appropriate average particle size is selected for the wax to be used according to the viscosity, etc., of the electron beam-curable printing ink composition and overprint varnish composition.

Preferably the content of the wax in the electron beam-curable printing ink composition and overprint varnish composition is in a range of 1.0 to 5.0% by mass.

If the content of the wax is lower than 1.0% by mass, the scratch resistance tends to drop, while a content higher than 5.0% by mass tends to lower the transferability of the ink.
(Solvent)

The electron beam-curable printing ink composition and overprint varnish composition may contain any known solvent to lower the viscosity and improve the wettability and spreadability on the base material, etc.

Solvents include water, glycol monoacetates, glycol diacetates, glycol ethers, lactic acid esters, etc., for example. Among these, water, tetraethylene glycol dialkyl ether, ethylene glycol monobutyl ether acetate, and diethyl diglycol are preferred.

If the electron beam-curable printing ink composition and overprint varnish composition contain a solvent, its content may be 0 to 50.0% by mass.
(Surface-Adjusting Agent)

The electron beam-curable printing ink composition and overprint varnish composition proposed by the present invention may contain any known surface-adjusting agent.

Among surface-adjusting agents, one or more types selected from the group that consists of silicon-based surface-adjusting agents, fluorine-based surface-adjusting agents, acrylic-based surface-adjusting agents, acetylene glycol-based surface-adjusting agents, etc., may be used, for example.

As for specific examples of surface-adjusting agents, one or more types selected from the group that consists of the BYK series manufactured by BYK-Chemie GmbH, TEGO series manufactured by Evonik Degussa Japan Co., Ltd., Polyflow series manufactured by Kyoeisha Chemical Co., Ltd., etc., may be used.

If the electron beam-curable printing ink composition and overprint varnish composition contain a surface-adjusting agent, its content may be 0.01 to 1.0% by mass.
[Method for Manufacturing]

The method for manufacturing the electron beam-curable printing ink composition and overprint varnish composition proposed by the present invention is not limited in any way, and any known method may be used.

For example, it may be prepared by adding all of the aforementioned components and then mixing them in a bead mill, triple roll mill, etc.

It may also be prepared by mixing the pigment, pigment dispersant, and various active energy ray-curable compounds to obtain a concentrated base beforehand, and then adding active energy ray-curable compounds, polymerization initiator, and if necessary, surfactant and other additives, to the concentrated base to achieve a desired composition.

In addition, it may also be prepared by mixing the aforementioned components and then kneading the mixture in a bead mill, triple roll mill, etc., to disperse the pigment (i.e., coloring component and extender pigment), followed by adding of additives (polymerization initiator, polymerization inhibitor, wax and other additives, etc.) as necessary, and further by viscosity adjustment through addition of other components.

The viscosity of the electron beam-curable printing ink composition and overprint varnish composition proposed by the present invention, which is adjusted as deemed appropriate according to the application, etc., and not limited in any way, is 2,000 mPa·s or lower, or preferably 1,500 mPa·s or lower, or more preferably 400 to 1,500 mPa·s, for example.

The base material on which to print or apply the electron beam-curable printing ink composition and overprint varnish composition proposed by the present invention may be plastic, paper, carton, etc., or a laminate or other composite base material comprising multiple of these base materials.

Among plastic base materials on which to print or apply the electron beam-curable printing ink composition and overprint varnish composition, one or more types selected from the group that consists of polyester-based polymers (such as polyethylene terephthalate (PET), polyethylene naphthalate, etc.), cellulose-based polymers (such as diacetyl cellulose, triacetyl cellulose (TAC), etc.), polycarbonate-based polymers, polyacrylic-based polymers (such as polymethylmethacrylate, etc.), vinyl chloride-based polymers, polyolefin-based polymers (such as polyethylene, polypropylene, polyolefin polymers having a cyclic or norbornene structure, ethylene-propylene copolymers, etc.), polyamide-based polymers (such as nylon, aromatic polyamide polymers, etc.), polystyrene-based polymers (such as polystyrene, acrylonitrile-styrene copolymers, etc.), polyimide-based polymers, polysulfone-based polymers, polyether sulfone-based polymers, polyether ketone-based polymers, polyphenyl sulfide-based polymers, polyvinyl alcohol-based polymers, polyvinylidene chloride-based polymers, polyvinyl butyral-based polymers, polyarylate-based polymers, polyoxymethylene-based polymers, polyepoxy-based polymers, blends of these polymers, etc., may be used.

(Methods for Printing and Application)

To print using the electron beam-curable printing ink composition proposed by the present invention, any known printing method may be adopted, along with curing conditions for electron beam-curable ink compositions. Also, to apply the overprint varnish composition under the present invention, any known application method may be adopted, along with curing conditions for electron beam-curable varnishes.

EXAMPLES

The present invention is explained in greater detail below by providing examples; however, the present invention is not limited to the following examples. It should be noted that, unless otherwise specified, "%" refers to "% by mass" and "part" refers to "part by mass." Additionally, the numbers indicating the quantities of respective materials in the table also represent "parts by mass." The unit of acid value is mgKOH/g.

(Electron Beam-Curable Printing Ink Compositions)

The components used in Table 1 below are listed below:
Rosin-modified maleic acid resin: HARIMACK M-453 (manufactured by Harima Chemicals Inc.)
Terpene phenol resin: TAMANOL 901 (manufactured by Arakawa Chemical Industries, Ltd.)
Dimethyl silicone oil 1: KF-96H-1,000 cs
Dimethyl silicone oil 2: KF-96H-100,000 cs
Side-chain epoxy-modified dimethyl silicone oil: KF-1001
Side-chain alicyclic epoxy-modified dimethyl silicone oil: KF-102
Side-chain, long-chain alkyl-modified dimethyl silicone oil: KF-4701
Side-chain aralkyl-modified dimethyl silicone oil: KF-410
Side-chain higher fatty acid ester-modified dimethyl silicone oil: X-22-715
Single-ended methacrylic-modified dimethyl silicone oil: X-22-2426
Double-ended methacrylic-modified dimethyl silicone oil: X-22-164E
Double-ended acrylic-modified dimethyl silicone oil: X-22-2445
(All of the Above Silicone Oils are Manufactured by Shin-Etsu Silicone Co., Ltd.)

(Adjustment of Active Energy Ray-Curable Printing Ink Compositions)

The respective components were compounded to achieve the formulations (% by mass) shown in Table 1, and then mixed under agitation, to obtain the active energy ray-curable printing ink compositions in the Examples and Comparative Examples.

(Method for Creating Coating Film)

The ink composition in each of the Examples and Comparative Examples below was applied on one side of a PET film using a ϕ0.2-mm bar coater.

(Electron Beam Curing)

An electron beam was irradiated on the ink composition application side of the PET film obtained above.

The acceleration voltage for electron beam generation was 90 kV for 10 kGy, and the processing speed was 30 m/min based on a single pass.

(UV Curing)

An ultraviolet ray was irradiated on the ink composition application side of the PET film obtained above. A 120-watt mercury lamp was used as a UV source, and the processing speed was 30 m/min based on a single pass.

(Scratch Resistance)

The cured ink coating film was scratched with a fingernail. This was repeated 10 times at the same location on the coating film.

◯: No scratch marks were left.

x: There is an area where scratch marks, however faint, were left.

(Adhesion)

A piece of Cellotape (registered trademark) was stuck on the cured ink coating film, and then peeled. This was repeated 5 times at the same location on the coating film and the result was evaluated.

◯: The coating film did not peel.

x: There is an area where the coating film peeled, however slightly.

TABLE 1

| | | Examples | | | | Comparative Examples | | | |
|---|---|---|---|---|---|---|---|---|---|
| | | 1 | 2 | 3 | 4 EB curing | 1 | 2 | 3 UV curing | 4 EB curing |
| Resin | Rosin-modified maleic acid resin | 50.0 | 50.0 | | 50.0 | 50.0 | 50.0 | 50.0 | 50.0 |
| | Terpene phenol resin | | | 50.0 | | | | | |
| Monomer | Trimethylolpropane triacrylate | 49.5 | 48.0 | 48.0 | 48.0 | 50.0 | 46.0 | 41.0 | 48.0 |
| Initiator | 2-methyl-1-(4-methylthiophenyl)-2-morpholinopropane-1-one | | | | | | | 5.0 | |
| | 4,4'-bis(diethylamino)benzophenone | | | | | | | 2.0 | |
| Silicone oil | Dimethyl silicone oil 1 | 0.5 | 2.0 | 2.0 | | | | | |
| | Dimethyl silicone oil 2 | | | | 2.0 | | 4.0 | 2.0 | |
| | Side-chain epoxy-modified dimethyl silicone oil | | | | | | | | 2.0 |
| | Side-chain alicyclic epoxy-modified dimethyl silicone oil | | | | | | | | |

TABLE 1-continued

| | | | | | | | | | |
|---|---|---|---|---|---|---|---|---|---|
| | Side-chain, long-chain alkyl-modified dimethyl silicone oil | | | | | | | | |
| | Side-chain aralkyl-modified dimethyl silicone oil | | | | | | | | |
| | Side-chain higher fatty acid ester-modified dimethyl silicone oil | | | | | | | | |
| | Single-ended methacrylic-modified dimethyl silicone oil | | | | | | | | |
| | Double-ended methacrylic-modified dimethyl silicone oil | | | | | | | | |
| | Double-ended acrylic-modified dimethyl silicone oil | | | | | | | | |
| Total | | 100 | 100 | 100 | 100 | 100 | 100 | 100 | 100 |
| Evaluation results | Scratch resistance (immediately after curing) | ○ | ○ | ○ | ○ | X | ○ | ○ | X |
| | Adhesion (immediately after curing) | ○ | ○ | ○ | ○ | X | X | X | ○ |
| | Adhesion (3 days later) | ○ | ○ | ○ | ○ | X | X | X | ○ |

| | | Comparative Examples | | | | | | |
|---|---|---|---|---|---|---|---|---|
| | | 5 | 6 | 7 | 8 EB curing | 9 | 10 | 11 |
| Resin | Rosin-modified maleic acid resin | 50.0 | 50.0 | 50.0 | 50.0 | 50.0 | 50.0 | 50.0 |
| | Terpene phenol resin | | | | | | | |
| Monomer | Trimethylolpropane triacrylate | 48.0 | 48.0 | 48.0 | 48.0 | 48.0 | 48.0 | 48.0 |
| Initiator | 2-methyl-1-(4-methylthiophenyl)-2-morpholinopropane-1-one | | | | | | | |
| | 4,4'-bis(diethylamino)benzophenone | | | | | | | |
| Silicone oil | Dimethyl silicone oil 1 | | | | | | | |
| | Dimethyl silicone oil 2 | | | | | | | |
| | Side-chain epoxy-modified dimethyl silicone oil | | | | | | | |
| | Side-chain alicyclic epoxy-modified dimethyl silicone oil | 2.0 | | | | | | |
| | Side-chain, long-chain alkyl-modified dimethyl silicone oil | | 2.0 | | | | | |
| | Side-chain aralkyl-modified dimethyl silicone oil | | | 2.0 | | | | |
| | Side-chain higher fatty acid ester-modified dimethyl silicone oil | | | | 2.0 | | | |
| | Single-ended methacrylic-modified dimethyl silicone oil | | | | | 2.0 | | |
| | Double-ended methacrylic-modified dimethyl silicone oil | | | | | | 2.0 | |
| | Double-ended acrylic-modified dimethyl silicone oil | | | | | | | 2.0 |
| Total | | 100 | 100 | 100 | 100 | 100 | 100 | 100 |
| Evaluation results | Scratch resistance (immediately after curing) | X | X | X | X | X | X | X |
| | Adhesion (immediately after curing) | ○ | X | ○ | X | ○ | ○ | ○ |
| | Adhesion (3 days later) | ○ | X | X | X | ○ | ○ | ○ |

According to Examples 1 to 4 based on ink compositions conforming to the present invention, the ink coating film cured sufficiently. In addition, they demonstrated good properties for all of: scratch resistance immediately after curing, adhesion to the base material immediately after curing, and adhesion three days later. These good properties were achieved even though they contained no traditional photopolymerization initiator, etc.

By contrast, Comparative Example 1 not containing dimethylpolysiloxane did not cure sufficiently and its scratch resistance, adhesion to the base material immediately after curing, and adhesion three days later, were all poor.

According to Comparative Example 2 containing dimethylpolysiloxane excessively, and also according to Comparative Example 3 representing an ink composition to which a photopolymerization initiator had been added and which was cured by irradiating a UV ray instead of electron beam, the ink coating film did not cure sufficiently and, while scratch resistance was good, both adhesion to the base material immediately after curing and adhesion three days later were poor.

According to Comparative Examples 4 to 11 in which various modified silicone oils were compounded in place of dimethylpolysiloxane, scratch resistance immediately after curing treatment by electron beam irradiation was poor, echoing the result of Comparative Example 1 not containing dimethylpolysiloxane. Also, some of Comparative Examples 4 to 11 presented poorer adhesion.

What is claimed is:

1. An electron beam-curable printing ink composition that contains:
   an unmodified dimethylpolysiloxane by 0.1 to 3.5% by mass relative to a total composition,
   a curable resin component by 20 to 60% by mass relative to a solid content of the electron beam-curable printing ink composition, a non-curable resin component by 30 to 60% by mass relative to the solid content of the electron beam-curable printing ink composition, wherein the non-curable resin component is one or more components selected from the group consisting of rosin-modified phenol resin, rosin-modified maleic acid resin, rosin-modified alkyd resin, rosin ester resin, fatty acid-modified rosin resin, and terpene phenol resin, and no polymerization initiator.

2. The electron beam-curable printing ink composition according to claim 1, that contains, as a curable resin component, one or more components selected from monomers, oligomers, and polymers, each of the foregoing having one or more unsaturated bonds.

3. The electron beam-curable printing ink composition according to claim 1, that contains, as a curable resin component, one or more components selected from monomers, oligomers, and polymers, each of the foregoing having two or more unsaturated bonds.

4. An overprint varnish composition that contains:
an unmodified dimethylpolysiloxane by 0.1 to 3.5% by mass relative to a total composition,
a curable resin component by 20 to 60% by mass relative to a solid content of the overprint varnish composition,
a non-curable resin component by 30 to 60% by mass relative to the solid content of the electron beam-curable printing ink composition, wherein the non-curable resin component is one or more components selected from the group consisting of rosin-modified phenol resin, rosin-modified maleic acid resin, rosin-modified alkyd resin, rosin ester resin, fatty acid-modified rosin resin, and terpene phenol resin, and no polymerization initiator.

5. The overprint varnish composition according to claim 4, that contains, as a curable resin component, one or more components selected from monomers, oligomers, and polymers, each of the foregoing having one or more unsaturated bonds.

6. The overprint varnish composition according to claim 4, that contains, as a curable resin component, one or more components selected from monomers, oligomers, and polymers, each of the foregoing having two or more unsaturated bonds.

* * * * *

UNITED STATES PATENT AND TRADEMARK OFFICE
CERTIFICATE OF CORRECTION

PATENT NO. : 12,116,489 B2
APPLICATION NO. : 17/435660
DATED : October 15, 2024
INVENTOR(S) : Keishiro Hishinuma, Naoki Omi and Aika Nishimoto It is certified that error appears in the above-identified patent and that said Letters Patent is hereby corrected as shown below:

In the Claims

At Column 22, Lines 4-5 (Lines 7-8 in Claim 4), "electron beam-curable printing ink composition" should be deleted, and --overprint varnish composition-- should be inserted.

Signed and Sealed this
Tenth Day of December, 2024

Katherine Kelly Vidal
*Director of the United States Patent and Trademark Office*